(12) United States Patent
Limpkin et al.

(10) Patent No.: US 12,731,193 B2
(45) **Date of Patent: *Sep. 8, 2026**

(54) SYSTEMS AND METHODS OF A BENEFICIARY FRAMEWORK

(71) Applicant: UKG Inc., Weston, FL (US)

(72) Inventors: Richard Limpkin, Kilkenny (IE); Ivelin Marinov, Varna (BG); Fiona Dardis, Kilkenny (IE)

(73) Assignee: UKG Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/662,321

(22) Filed: May 13, 2024

(65) Prior Publication Data

US 2025/0348951 A1 Nov. 13, 2025

(51) Int. Cl.
*G06Q 40/12* (2023.01)

(52) U.S. Cl.
CPC .................................. *G06Q 40/125* (2013.12)

(58) Field of Classification Search
CPC .................................................... G06Q 40/125
See application file for complete search history.

(56) References Cited

U.S. PATENT DOCUMENTS

2020/0118219 A1* 4/2020 Mauricio ............. G06Q 10/105
2021/0097549 A1* 4/2021 Moitra ................... G06Q 20/26
2022/0005038 A1* 1/2022 Miller .................... G06Q 20/02
2023/0368214 A1* 11/2023 Suryanarayana ...... G06Q 50/18
2025/0111446 A1* 4/2025 Liu ...................... G06Q 40/125

FOREIGN PATENT DOCUMENTS

WO WO-2020128895 A1 * 6/2020 ........... G06Q 20/108

* cited by examiner

*Primary Examiner* — Garcia Ade

(74) *Attorney, Agent, or Firm* — ArentFox Schiff LLP; Michael Fainberg

(57) ABSTRACT

Disclosed herein are systems and methods for validating payroll information using a beneficiary framework. An exemplary method may include: receiving a request to add, to a payment profile of a company, a beneficiary configuration including information about a first geographic location and a first payment rail; generating a plurality of localization rules associated with the beneficiary configuration; receiving a first user input including at least one data value associated with an employee of the company; determining that the employee is associated with the beneficiary configuration; while receiving the first user input, validating, in real-time, whether the at least one data value of the first user input satisfies criteria provided by the plurality of localization rules; and in response to determining that the at least one data value satisfies the criteria, generating, on a graphical user interface, an indication that a potential payroll transaction will be successful.

20 Claims, 8 Drawing Sheets

200

Navigation Interface 201

Beneficiaries List 204

Add Button 206

Dashboard
Inputs
Process
Analyze
Tax
Security
Setup
Payment
Beneficiaries
Employee Beneficiaries
Local Authority Beneficiaries
Employer Beneficiaries
Finance Details
Funds In
Payment Providers File Uploads
Manage FX Funds

| ID | Beneficiary Name | Country | ... | Bank Name |
|---|---|---|---|---|
| 25 | Company A | Germany | ... | Bank 123 |
| 27 | Company A | France | ... | Bank 456 |
| 31 | Company B | France | ... | Bank 789 |
| | | | ... | |
| | | | ... | |
| | | | ... | |
| | | | ... | |
| | | | ... | |
| | | | ... | |
| | | | ... | |

Add

FIG. 2

SYSTEMS AND METHODS OF A BENEFICIARY FRAMEWORK

FIELD OF TECHNOLOGY

The present disclosure relates to the field of payroll systems, and, more specifically, to systems and methods of a beneficiary framework.

BACKGROUND

Payroll transactions are an essential part of the world economy as they provide employees with their salaries, employers with their costs, and governmental entities with fees and taxes. As companies have grown to a global scale, the complexities of payroll transactions and statutory payments have risen. For example, an office in a first country may have employees that are taxed differently than an office in a second country, despite both offices being associated with a single company. The ability to execute cross border payments factoring in global flight times and global funding times to ensure that funds reach bank accounts on the due dates is highly complex and highly risky in certain countries.

In conventional systems, payroll transactions have been carried out using manual commands by payroll specialists. For example, executing payments on a global scale can only be achieved by using a third party platform. While payrolls are initiated on a first platform (e.g., payroll software of the company), manual steps are required in logging into another platform (e.g., specific to a country, bank, or financial institution) to execute the payments. This is prone to error due to the manual nature of the activity and prone to delays caused by failing any additional compliance checks required to process internationally. Because the size and reach of companies has been on a rise, there is a need to move away from manual commands, which scale poorly.

SUMMARY

In one exemplary aspect, the techniques described herein relate to a system for validating payroll information using a beneficiary framework, including: at least one memory; and at least one hardware processor coupled with the at least one memory and configured, individually or in combination, to: receive a request to add, to a payment profile of a company, a beneficiary configuration including information about a first geographic location and a first payment rail; generate a plurality of localization rules associated with the beneficiary configuration based on the information about the first geographic location and the first payment rail; receive a first user input including at least one data value associated with an employee of the company; determine that the employee is associated with the beneficiary configuration; while receiving the first user input, validate, in real-time, whether the at least one data value of the first user input satisfies criteria provided by the plurality of localization rules generated for the beneficiary configuration; and in response to determining that the at least one data value satisfies the criteria, generate, on a graphical user interface, an indication that a potential payroll transaction will be successful and an option to track the potential payroll transaction when executed.

In some aspects, the techniques described herein relate to a system, wherein the at least one hardware processor is configured to determine that the employee is associated with the beneficiary configuration by determining that the employee has requested payroll transactions via the first payment rail.

In some aspects, the techniques described herein relate to a system, wherein the at least one hardware processor is configured to determine that the employee is associated with the beneficiary configuration by determining that the employee is a resident or works in the first geographic location.

In some aspects, the techniques described herein relate to a system, wherein the at least one hardware processor is further configured to: receive a request to track the potential payroll transaction after the potential payroll transaction is executed; and generate, on the graphical user interface, a tracker that indicates a current status of the potential payroll transaction.

In some aspects, the techniques described herein relate to a system, wherein the current status is one of: generate payment transaction, lock-in rate, generate payment file, request funds, and close payments.

In some aspects, the techniques described herein relate to a system, wherein information about a geographic location indicates local tax laws, local currency, and local transactional rules, and wherein information about a payment rail includes funding time, payment type, and foreign exchange rates.

In some aspects, the techniques described herein relate to a system, wherein the at least one hardware processor is further configured to: receive a second user input including at least one other data value associated with a different employee of the company, wherein payroll transactions of the different employee are executed using a different beneficiary configuration in the payment profile of the company; and validate the at least one other data value using a different plurality of localization rules of the different beneficiary configuration.

In some aspects, the techniques described herein relate to a system, wherein the different beneficiary configuration includes information about a second geographic location different from the first geographic location and/or a second payment rail different from the first payment rail.

In some aspects, the techniques described herein relate to a system, wherein the at least one data value is a national identification number of the employee, and wherein determining that the at least one data value does not satisfy criteria of the different plurality of localization rules includes determining that the national identification number has an invalid format, and wherein determining that the at least one other data value satisfies the criteria of the different plurality of localization rules includes determining that the national identification number is not required to complete the payroll transactions.

In some aspects, the techniques described herein relate to a system, wherein the at least one data value includes a first data value and a second data value, wherein the at least one hardware processor is further configured to determine that the at least one data value does not satisfy the criteria in response to determining that the first data value contradicts and the second data value.

In some aspects, the techniques described herein relate to a system, wherein the at least one hardware processor is further configured to generate, on the graphical user interface, at least one option to correct the at least one data value.

In some aspects, the techniques described herein relate to a system, wherein the at least one hardware processor is further configured to: receive a second user input including at least one corrected data value to replace the at least one data value; and validate whether the at least one corrected data value satisfies the criteria provided by the plurality of localization rules.

In some aspects, the techniques described herein relate to a method for validating payroll information using a beneficiary framework, including: receiving a request to add, to a payment profile of a company, a beneficiary configuration including information about a first geographic location and a first payment rail; generating a plurality of localization rules associated with the beneficiary configuration based on the information about the first geographic location and the first payment rail; receiving a first user input including at least one data value associated with an employee of the company; determining that the employee is associated with the beneficiary configuration; while receiving the first user input, validating, in real-time, whether the at least one data value of the first user input satisfies criteria provided by the plurality of localization rules generated for the beneficiary configuration; and in response to determining that the at least one data value satisfies the criteria, generating, on a graphical user interface, an indication that a potential payroll transaction will be successful and an option to track the potential payroll transaction when executed.

In some aspects, the techniques described herein relate to a non-transitory computer readable medium storing thereon computer executable instructions for validating payroll information using a beneficiary framework, including instructions for: receiving a request to add, to a payment profile of a company, a beneficiary configuration including information about a first geographic location and a first payment rail; generating a plurality of localization rules associated with the beneficiary configuration based on the information about the first geographic location and the first payment rail; receiving a first user input including at least one data value associated with an employee of the company; determining that the employee is associated with the beneficiary configuration; while receiving the first user input, validating, in real-time, whether the at least one data value of the first user input satisfies criteria provided by the plurality of localization rules generated for the beneficiary configuration; and in response to determining that the at least one data value satisfies the criteria, generating, on a graphical user interface, an indication that a potential payroll transaction will be successful and an option to track the potential payroll transaction when executed.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is a diagram illustrating a graphical user interface (GUI) depicting a list of beneficiaries.

DETAILED DESCRIPTION

Figure 1:
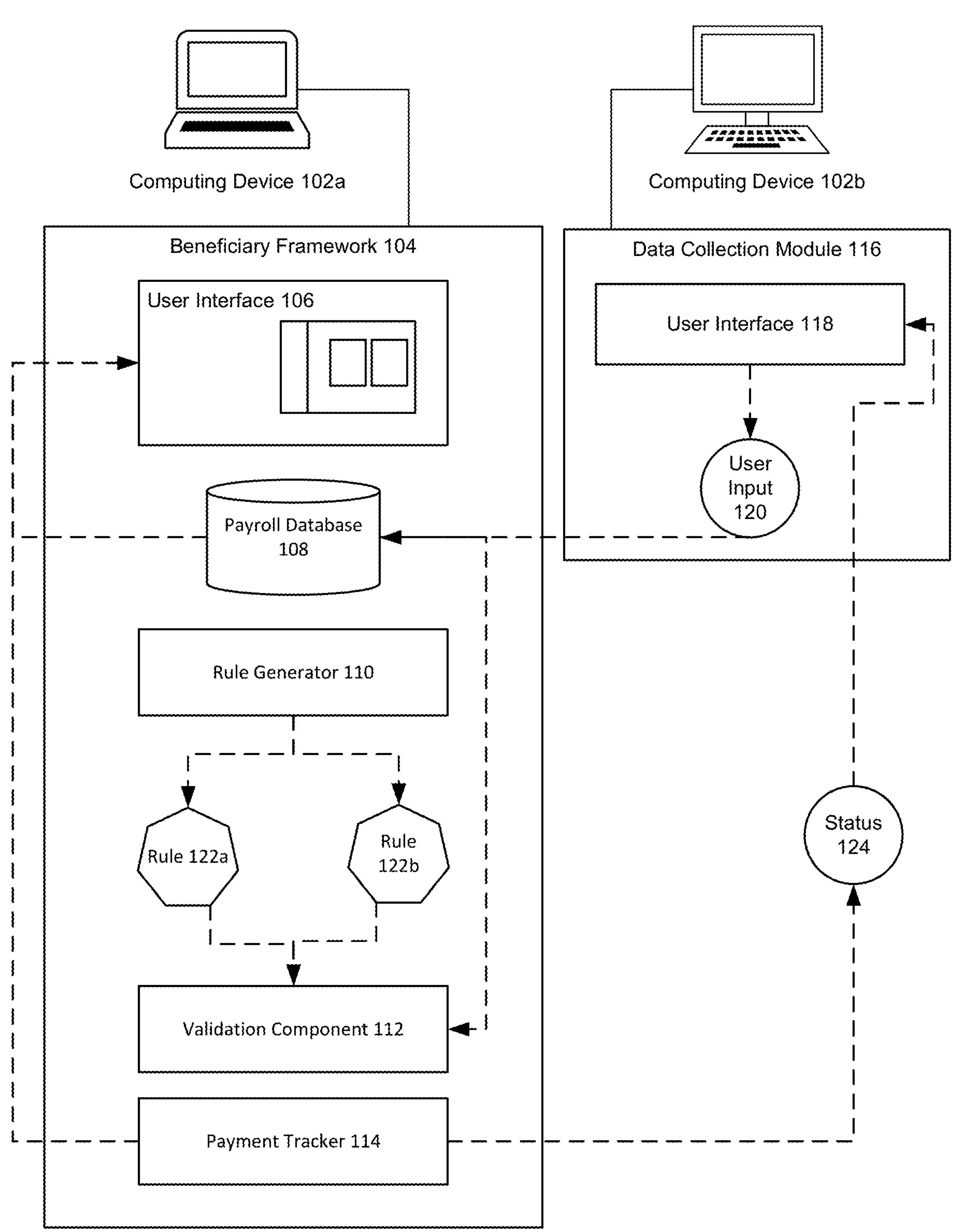
FIG. 1 is a block diagram illustrating a system of a beneficiary framework.

Exemplary aspects are described herein in the context of a system, method, and computer program product of a beneficiary framework. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure introduces a beneficiary framework, which is a flexible framework that allows users to configure a set of rules per payment rail per country. Instead of building complex logic which needs to be re-written whenever a new country is added, the system is flexible enough to allow the user to create a new rule on demand and make it available instantly. Once the rule and rail are set, all data collected from multiple upstream human capital management (HCM) systems is validated against the rule ensuring good quality of payments data. This is particularly important in the global context as Tier 1 HCM do not always have the ability to validate global rails. This suggests that the data stored for employee bank accounts, for example, may not be accurate to ensure payment globally.

In addition to the beneficiary framework, the present disclosure introduces an extensive automated payments capability, which is built off the configuration at pay group level and the payroll calendar for the payroll. This capability extends to enhanced beneficiary validation in addition to the beneficiary framework via API and webhook integration with payment partners to ensure that the additional compliance checks required for processing globally are executed as soon as bank details are entered or updated on the platform. Such additional compliance checks include verifying the identities of the sender and recipient, assessing the purpose of the payment, and screening for any suspicious transactions to prevent money laundering, fraud, and other illicit activities. For example, there may be sanctioned persons checks in which particular names may appear on a sanctions list and trigger additional checking or result in the person being disqualified from being paid over a border.

Once a payroll is approved, a foreign exchange (FX) transaction is booked directly with payment partners and an FX rate and funding request are generated with a person having to be involved. Based on the configuration of the pay group, funds may even be pulled directly from the customer's bank account to fund the payments for both employee net pay and statutory payments.

Through extensive webhooks, it is possible to view the status of a payment throughout the lifecycle of the payment from "booked," to "funds received" to "payments sent to the employee." This provides increased transparency and fewer queries to be raised to check the status of a payment.

FIG. 1 is a block diagram illustrating a system 100 comprising the beneficiary framework 104. System 100 includes computing device 102*a* and computing device 102*b*. For example, computing device 102*a* may be a laptop, desktop, etc., of a company that monitors payroll information and computing device 102*b* may be a laptop, desktop, server, etc., of an employee.

Computing device 102*a* may execute a beneficiary framework 104, which provides user interface 106 (described in FIGS. 2-5). User interface 106 may display the information in payroll database 108. In some aspects, payroll database 108 includes information about various payment rails in different countries and executed payroll transactions. A payment rail represents a network that enables the transfer of funds between two or more parties (e.g., comprising individuals, businesses, financial institutions, etc.). Examples of payment rails include credit/debit cards, automated clearing house (ACH) payments, wire transfers, real-time payments (RTP), cryptocurrency, etc. As mentioned before, each country may have different requirements for executing the transfer of funds. For example, a first country may require a particular type of identification number (e.g., a social security number) that a second country may not require to execute a transfer. Because the functionality and criteria of each payment rail differs in each country, companies that expand to a new location (e.g., open an office in a new country) cannot immediately set up payroll transactions. This is because there are many factors to consider such as location-based criteria, tax laws, currency conversions, etc.

Once payroll transactions have been set up, conventional computer systems perform various calculations for each employee to ensure that the proper funds are transferred. For example, computing devices may calculate the amount of tax to withhold, the converted amount when currencies are different (e.g., USD to CAD), benefit costs, etc. If a transaction fails, there are two consequences. Firstly, from a human perspective, because funds may take multiple business days, employees need to wait twice the amount of time to get funded (e.g., once for the originally failed transaction and once more for the subsequent transaction). Second, the amount of resources spent on performing the calculations is wasted and a recalculation may be required. As mentioned before, because company sizes and outreach has increased, calculation redundancy can cause a non-trivial amount of processing and memory that could have been allocated for other purposes. To address both of these issues, beneficiary framework 104 includes rule generator 110, validation component 112, and payment tracker 114.

Rule generator 110 enables a company administrator to set up rules per payment rail per country. For example, if a company expands to a new country, a user responsible for payroll transactions can create a rule set for validating payroll transactions. These rules may be referred to as localization rules that are catered towards a particular payment rail and particular country. For example, if the payment rail involves a direct bank deposit, the user may create rule 122*a* that involves verifying an identification number of a particular length. In some aspects, rule 122*b* may be associated with a different payment rail of a different country. Similar to rule 122*a*, rule 122*b* may verify an identification number of a particular length albeit of a different kind. For example, the number associated with rule 122*a* may be a social security number and the number associated with rule 122*b* may be a social insurance number.

Computing device 102*b* may execute data collection module 116, which includes a user interface 118. User interface 118 may enable an employee to input information about themselves. For example, user interface 118 may be an interface of a web application, a standalone application, a website, etc. User interface 118 may request the employee to input various data values to build an employee profile. Data values include, but are not limited to, name, address, job title, a government-issued identification number, date of birth, marital status, number of dependents, and emergency contact.

Data collection module 116 may be configured to upload the inputs gathered via user interface 118 to payroll database 108. In particular, payroll database 108 may be configured and accessed via beneficiary framework 104. It should be noted that payroll database 108 may receive the data values from a plurality of computing devices belonging to different employees. Each data collection module 116 of a respective computing device may be connected to payroll database 108 via a network (e.g., a local area network, a wide area network, etc.).

In some aspects, beneficiary framework 104 may be an application split into a thick and thin client application. The thick client application may be used to generate rules, access payroll database 108, and perform validation of the data in payroll database 108 using the generated rules. In some aspects, the thick client application may be executed on a remote server. The thin client application may receive validation results and generate user interface 118 on computing device 102*b*.

In an exemplary aspect, validation component 112 retrieves data in payroll database 108. For example, beneficiary framework 104 may receive a first user input that includes at least one data value associated with an employee of a company. Suppose that the company is an international retailer that has multiple offices throughout the world. For example, the company may have an office in a country (e.g., France) and another office in a different country (e.g., United States). Suppose that the first user input is associated with an employee from the United States. Accordingly, the at least one data value may include a name, an address, a marital status, and a social security number. The data values may be: "John Doe" as the name, "123 John Doe St., New York 10021" as the address, "single" as the marital status, and "123-45-56789 as the social security number." It should be noted that the following examples provided are highly simplified for the sake of brevity and understanding. For example, the amount of data values received per user input may be quite large despite only four data values being given in the example.

It should also be noted that rather than be divided into countries/offices, employees may be divided into different pay groups (i.e., a group of employees paid at the same time). Each of those employees may be part of the same office or different offices.

The purpose of gathering these data values is to complete payroll transactions of the company in a given geographic location (e.g., a country). For example, an employee may provide the data values in order to enable a payback deposit in his/her bank account. The payroll transaction may need the data values for identification purposes and to perform calculations of taxation, fees, credits, salary, benefits, etc. For example, the person may have a bi-weekly paycheck deposit of $2000 and based on the information provided in the data values, the company may be able to determine the amount of tax the person owes (e.g., using marital status).

Because a company may be spread out across multiple geographic locations (e.g., cities, towns, states, provinces, countries, continents, etc.), the guidelines for performing payroll transactions may be different depending on the location of the office that the employee works in. For example, the tax rules in the United Kingdom may be different than the tax laws in the United States. Similarly, certain identifiers such as a social security number may be required in one country (e.g., the United States), but not in other countries that utilize a different identification system (e.g., a social insurance number that is used in Canada).

When a user enters data values using user interface 118, data collection module 1116 may immediately upload the values to payroll database 108. Beneficiary framework 104 may detect that payroll database 108 has been updated and may be begin validation on the new data values received using validation component 112.

In an exemplary aspect, while receiving user input 120, validation component 112 validates the at least one data value of user input 120. In some aspects, this involves first determining a data type of the at least one data value. For example, user input 120 may be [John Doe; 123 John Doe St., New York 10021; single; 123-45-56789]. For each data value, a data parser may identify one or more data types. For example, a first data type may be "social security number." The icons for types name, address, marital status, etc., are not shown in FIG. 1.

Each data type and geographic location may be linked to a plurality of localization rules generated by rule generator 110. For example, rule **122*a* may be linked with the first data type and the first geographic location (e.g., the location of the office or the residential location of the employee). Suppose that user input 120 is for an employee working in the United States. Rule 122*a*** represents a localization rule associated with social security numbers in the United States.

It should be noted that the same data type may have different rules in different geographic locations. For example, a second data type may also be social security number. However, if the geographic location is the Canada, then the data parser retrieves rule **122*b* instead of rule 122*a***.

Localization rules establish certain criteria for a data value. For example, a rule may query the format of the data value. For example, a social security number is a 9-digit value that includes solely integers. Accordingly, rule **122*a*** may indicate that the social security number must be nine digits. Other examples of localization rules may be: (1) the social security number cannot have symbols or letters; (2) the social security number should be formatted with 3 digits, followed by 2 digits, followed by 4 digits, (3) the social security number is only issued to persons that are citizens or permanent residents of the United States, etc.

From user input 120, validation component 112 may extract a numerical data value (e.g., 123-45-56789) and assess the validity of the data value in view of the criteria of the plurality of localization rules. For example, validation component 112 may determine that the input social security number has 10-digits. Accordingly, the numerical data value has an error. Suppose that in another data value, the employee indicates that he/she is not a citizen and is not a permanent resident. Based on the localization rules, this indicates that the employee should not have a social security number. Accordingly, the mere presence of the numerical data value would trigger an error. Errors are provided to the user and/or the company for review.

In an exemplary aspect, payment tracker 114 is used to determine whether a payment to an employee has been successful. Payment tracker 114 may, for example, output status 124, which indicates where the payment is in the process. Conventional systems execute a transaction and then begin validation. If the validation is unsuccessful, the transaction fails and the needs to be redone. As mentioned before, this wastes time for the employer, employees, etc., and wastes computer resources. In contrast, in the present disclosure, beneficiary framework 104 validates user inputs using localization rules and when a transaction is initiated, informs the users (e.g., employer and employee) of whether the transaction will be successful before funds are transferred. If there is an issue, the users know before the execution and can resolve any issues before entities (e.g., financial institutions such as banks) in the payment rail get involved. As the transaction is executed, payment tracker 114 further provides status 124 indicative of whether the payment is in the process, which further reduces the amount of employee-generated queries asking for the status. Examples of status 124 may include "booked," "funds received," "transfer complete," etc.

FIG. 2 is a diagram 200 illustrating a graphical user interface (GUI) depicting a list of beneficiaries. In one aspect, the GUI includes a navigation interface 201 which includes a column depicting a menu. The options in the menu include, but are not limited to, dashboard, inputs, process, analyze, tax, etc. The GUI may receive a selection of an option (such as Payment), which generates a sub-menu. For example, in diagram 200, the sub-menu includes options such as Beneficiaries, Finance Details, etc. The GUI may receive a subsequent selection of an option, which generates yet another sub-menu. For example, in diagram 200, the subsequent selection may be of the Beneficiaries option, which generates further options such as Employee Beneficiaries, Local Authority Beneficiaries, etc.

In an exemplary aspect, when receiving a selection of the Beneficiaries option, the GUI outputs beneficiaries list 204. In diagram 200, the beneficiaries list 204 is a table comprising various types of data such as, but not limited to, ID, Beneficiary name, country, bank name, etc. Each row in beneficiaries list 204 includes a particular beneficiary, which is a payroll entity associated with a particular company, country, and payment rail. For example, the first row is for a beneficiary associated with company A in Germany using bank 123. The second row is for a beneficiary also associated with company A, but in France using bank 456. The third row is for a beneficiary located in France, but for a different company (e.g., company B) and a different bank (e.g., bank 789).

Figure 3:
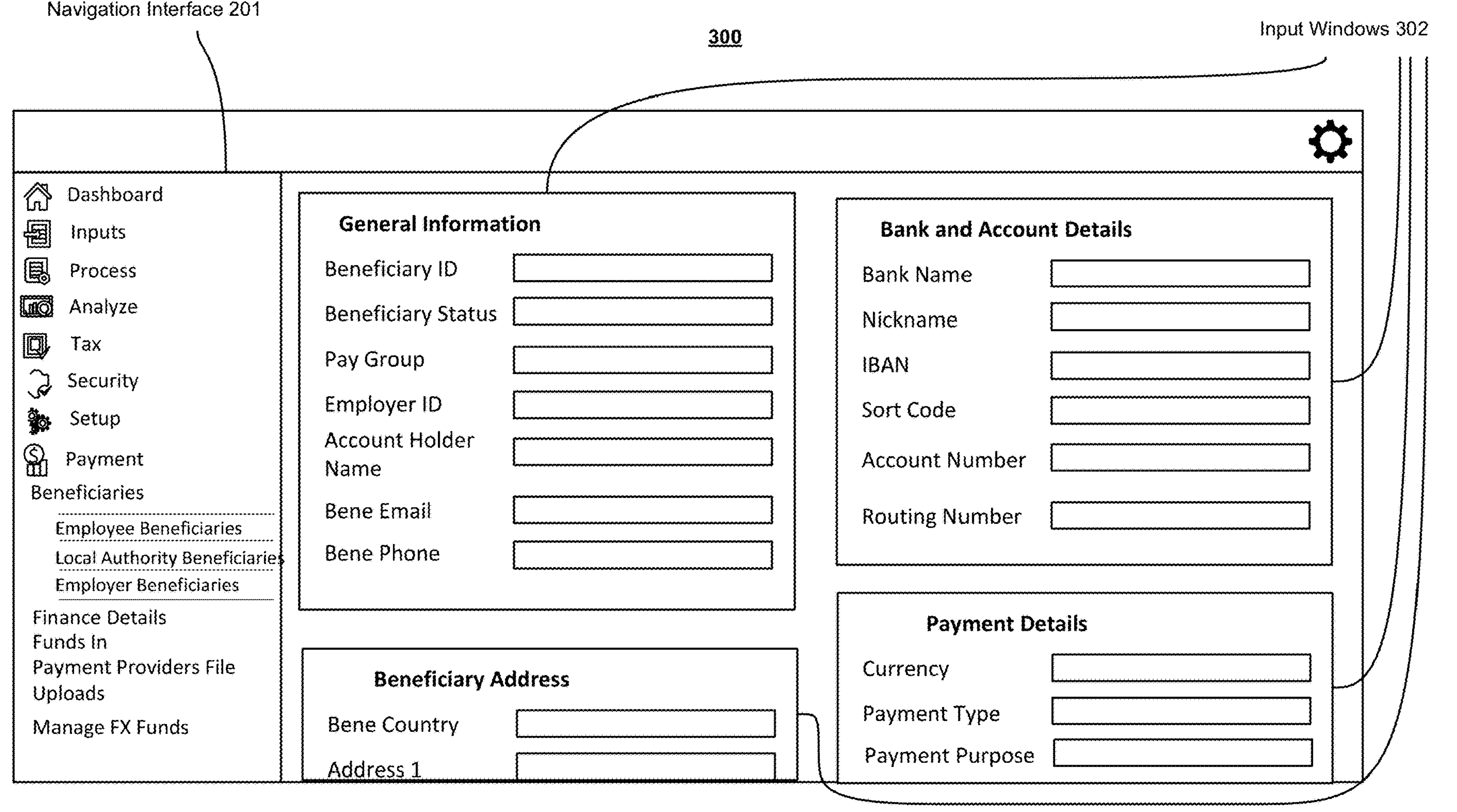
FIG. 3 is a diagram illustrating the GUI depicting input windows for adding a beneficiary.

When a user would like to add a new beneficiary, the user may select add button 206, which generates the view shown in FIG. 3. For example, a user may be responsible for handling payrolls for a particular company such as company A. Company A may open a new office in a country that it did not previously have an office in such as the United States.

FIG. 3 is a diagram 300 illustrating the GUI depicting input windows for adding a beneficiary. For example, in response to receiving a selection of add button 206, the GUI may generate input windows 302. These input windows collect information using text boxes, drop down menus, and selectable options. For example, the input window for general information receives data values such as, but not limited to, beneficiary ID (e.g., an alpha numeric value), beneficiary status (e.g., active/inactive), pay group (e.g., an alpha numeric value indicative of which pay group the beneficiary will be a part of), employer ID, account holder name, email, and phone number. The user may further provide address information, bank and account details, and payment details.

Figure 4:
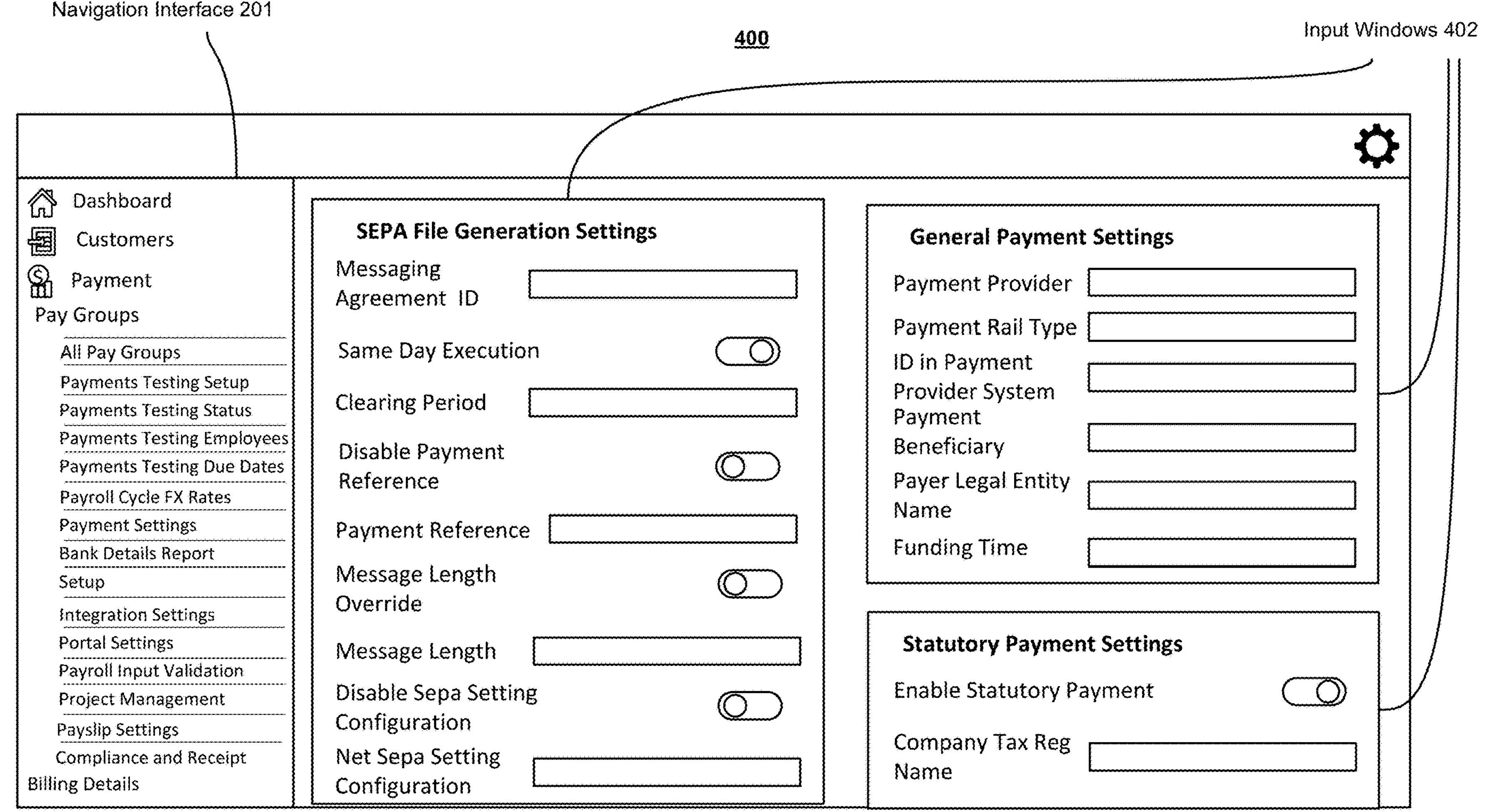
FIG. 4 is a diagram illustrating the GUI for setting up a payment rail.

FIG. 4 is a diagram 400 illustrating the GUI for setting up a payment rail. In diagram 400, the SEPA file is an internationally recognized ISO 27001 file format for payment of net pay via a bank file. The GUI generates the output shown in diagram 400 after receiving the inputs in diagram 300. The payment rail details include options such as whether to perform same day execution, whether to override message length, etc. In addition, input windows 402 collect information about the payment provider, payment rail type, funding time, etc. In some aspects, the GUI further receives information about the currency in which funds are to be received.

Figure 5A:
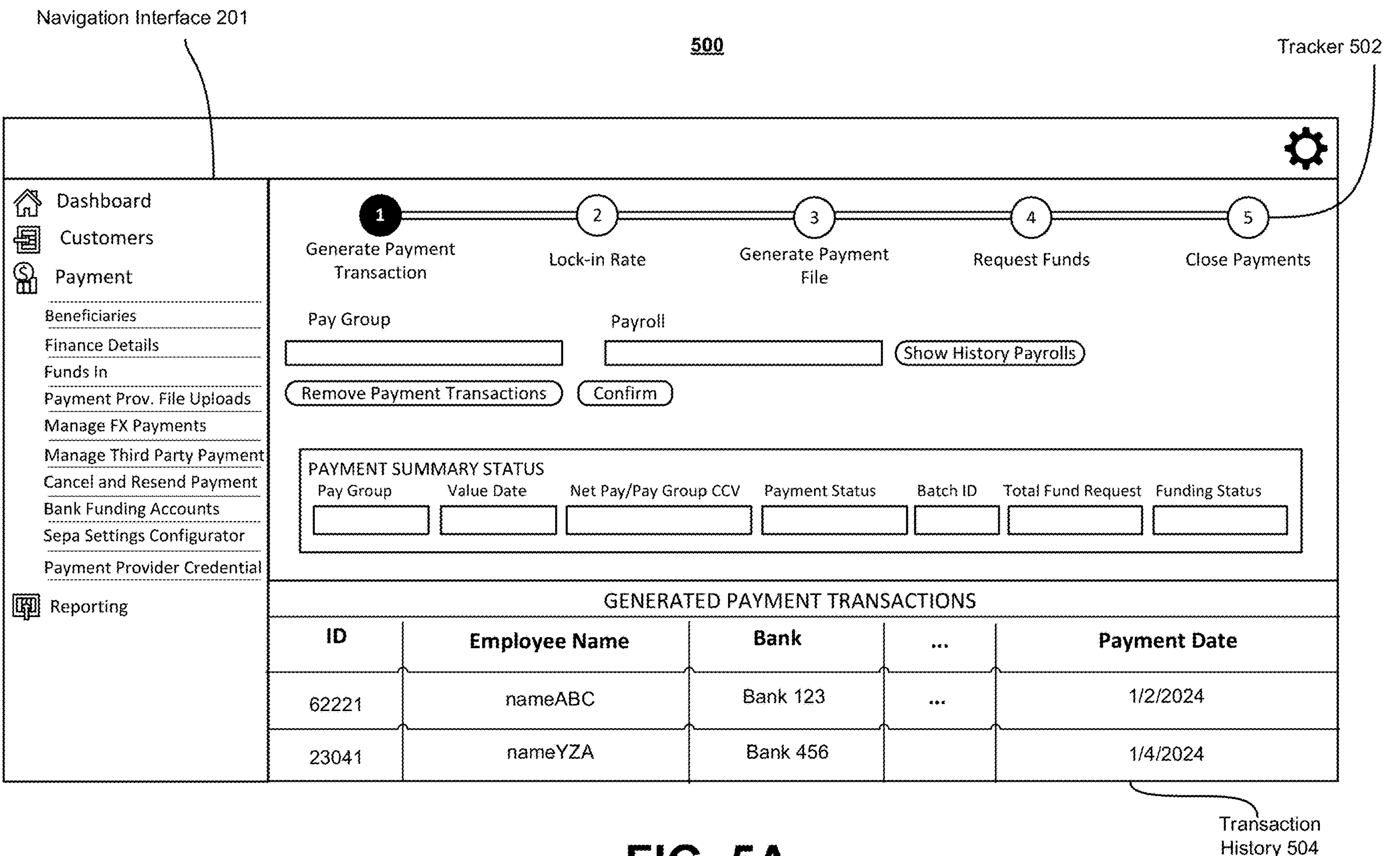
FIG. 5A is a diagram illustrating the GUI depicting a payment tracker at a first stage.

FIG. 5A is a diagram 500 illustrating the GUI depicting a payment tracker at a first stage. In this stage, the user generates a payment transaction. For example, the user may be an employer that is attempting to pay an employee via a particular beneficiary. For example, the user may select employee ABC located in Germany and pay the user using a bank deposit via bank 123. The user may enter information such as the pay group that the employee is a part of, the amount to transfer, etc. Tracker 502 displays the current status (e.g., status 124) of the transaction. Older transactions are shown in a table called transaction history 504. A user may select a transaction to receive the status of the transaction and information such as payment date, employee name, bank, etc. There may be various rules that are created for verifying transactions. For example, in one country, there may be a rule for a particular provider and payment rail. Suppose that the country is the United Kingdom. The currency may be GBP. The payment provider may be Transfermate and the payment rail type may be a wire transfer. For this configuration, the following example rules may be created:

The user needs to be provide a sort code.

The sort code must be 6 digits.

The user needs to provide an account number.

The account number must be 8 digits.

Suppose that the currency is now EUR. The payment provider may remain Transfermate. The payment rail type may be the same as well. However, in this configuration, the following example rules may be created:

The user needs to be provide a BIC/SWIFT number.

The BIC/SWIFT number must be 8 or 11 characters.

The user needs to provide an IBAN.

The IBAN must be 22 digits.

Figure 5B:
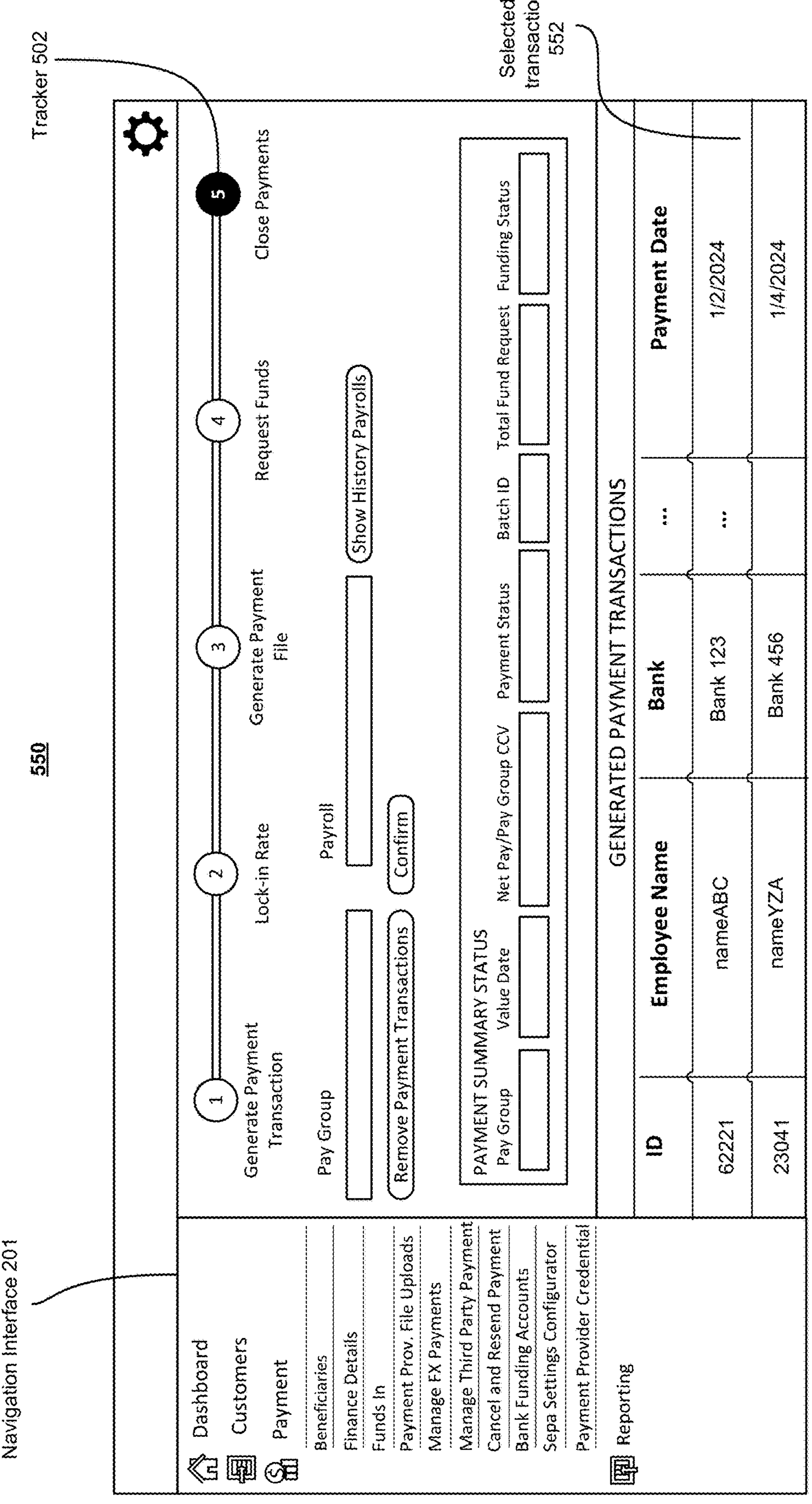
FIG. 5B is a diagram illustrating the GUI depicting a payment tracker at a second stage.

FIG. 5B is a diagram 550 illustrating the GUI depicting a payment tracker at a second stage. The other stages shown in tracker 502 include lock-in rate (e.g., locking in a foreign exchange rate), generate payment file, request funds, and close payments. In the "generate payment file" stage, the transaction is sent to the payment provider in the form of an API request. In the "request funds" stage, a payment request is auto generated for the customer and delivered via a customer portal so that the customer knows how much needs to be transferred after the booking is made. In the "close payments" stage, the task is closed to end the payment workflow. In diagram 550, selected transaction 552 is shown to be closed (e.g., complete).

Figure 6:
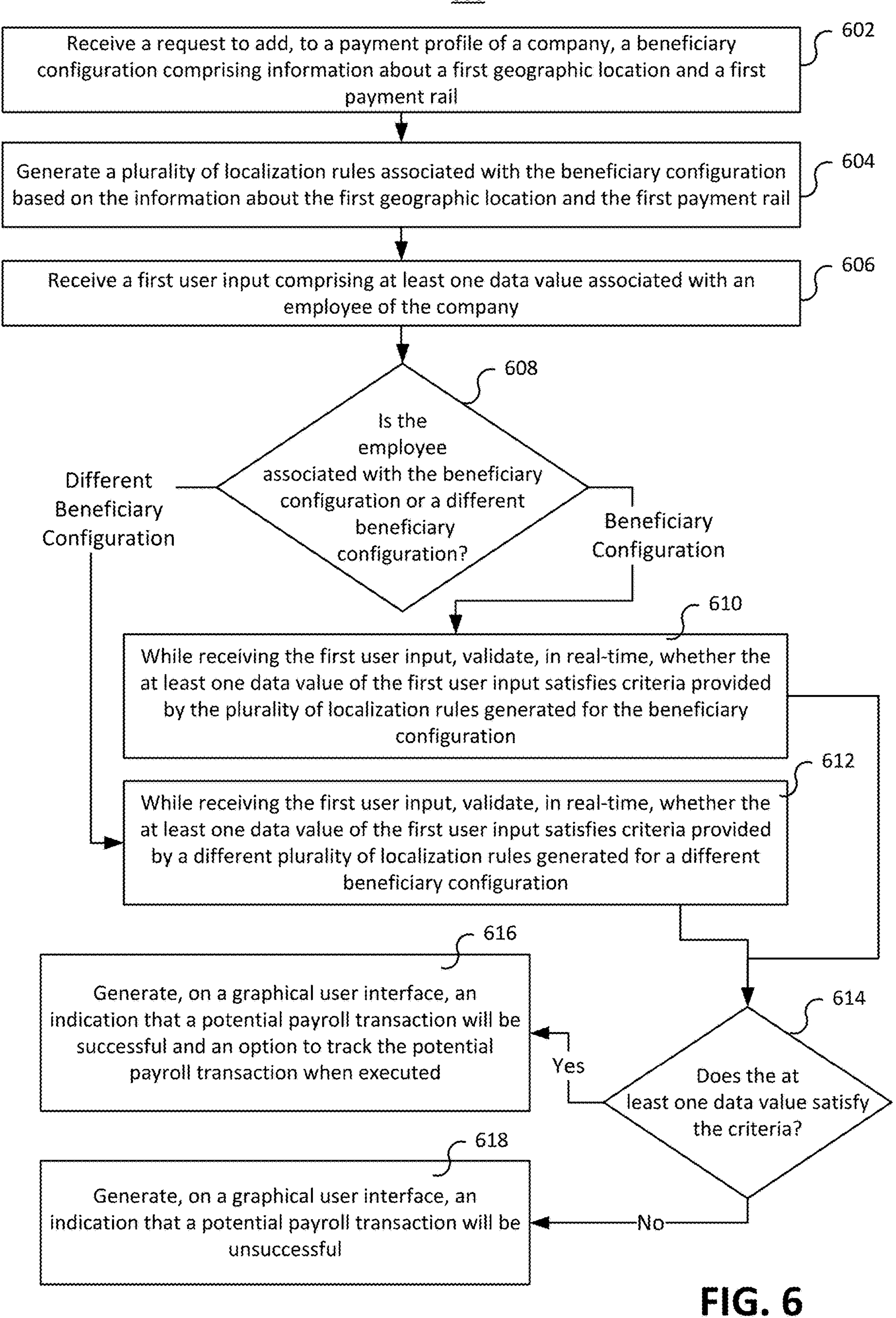
FIG. 6 illustrates a flow diagram of a method of a beneficiary framework.

FIG. 6 illustrates a flow diagram of a method 600 of a beneficiary framework. At 602, beneficiary framework 104 receives a request to add, to a payment profile of a company, a beneficiary configuration comprising information about a first geographic location and a first payment rail. For example, a user may select add button 206 on user interface 106 to add a new beneficiary. The first geographic location may be the United States or a particular state, city, or town in the country. The first payment rail may be a bank deposit.

At 604, beneficiary framework 104 generates a plurality of localization rules (e.g., rules 122*a*, 122*b*) associated with the beneficiary configuration based on the information about the first geographic location and the first payment rail. In some aspects, information about a geographic location indicates local tax laws, local currency, and local transactional rules, and information about a payment rail includes funding time, payment type, and foreign exchange rates as found in payroll database 108. The plurality of localization rules may indicate the necessary data values and their correct structure that will allow a transfer of funds over the payment rail without any issues. For example, if the first geographic location requires that an employee provide a passport number according to tax laws, generated rule(s) may indicate that a passport number is needed, that the passport number needs to be 8 digits, that the number should only have integers, that the passport needs to be valid (e.g., not expired), etc.

At 606, beneficiary framework 104 receives a first user input comprising at least one data value associated with an employee of the company. For example, the employee may enter his/her passport number via user interface 118.

At 608, beneficiary framework 104 determines, by validation component 112, whether the employee is associated with the beneficiary configuration that has just been created or an existing different beneficiary configuration. In some aspects, the different beneficiary configuration comprises information about a second geographic location (e.g., Toronto, Canada) different from the first geographic location and/or a second payment rail (e.g., credit card) different from the first payment rail. In response to determining that the employee is associated with the beneficiary configuration, method 600 advances to 610. In response to determining that the employee is associated with the different beneficiary configuration, method 600 advances to 612.

In some aspects, beneficiary framework 104 determines that the employee is associated with the beneficiary configuration by determining that the employee has requested payroll transactions via the first payment rail. In some aspects, beneficiary framework 104 determines that the employee is associated with the beneficiary configuration by determining that the employee is a resident or works in the first geographic location.

At 610, while receiving the first user input, beneficiary framework 104 validates, in real-time, whether the at least one data value of the first user input satisfies criteria provided by the plurality of localization rules generated for the beneficiary configuration.

At 612, while receiving the first user input, beneficiary framework 104 validates, in real-time, whether the at least one data value of the first user input satisfies criteria provided by a different plurality of localization rules generated for the different beneficiary configuration.

At 614, beneficiary framework 104 determines whether the at least one data value satisfies the criteria. If it does, method 600 advances to 616. Otherwise, method 600 advances to 618. For example, the at least one data value may be a national identification number (e.g., social security number) of the employee, beneficiary framework 104 may determine that the at least one data value does not satisfy criteria of the different plurality of localization rules by determining that the national identification number has an invalid format. In contrast, determining that the at least one other data value satisfies the criteria of the different plurality of localization rules may involve determining that the national identification number is not required to complete the payroll transactions.

In some aspects, the at least one data value comprises a first data value and a second data value, and beneficiary framework 104 determines that the at least one data value does not satisfy the criteria in response to determining that the first data value contradicts and the second data value. For example, the first data value may indicate that employee has a bachelor's degree and the second data value may indicate that the last education institution attended by the person is a high school. A localization rule may indicate that a bachelor's degree requires the last attended education institution to be a college or a university. Accordingly, the first data value contradicts with the second data value.

At 616, in response to determining that the at least one data value satisfies the criteria, beneficiary framework 104 generates, on a graphical user interface (e.g., user interface 106 and/or user interface 118), an indication that a potential payroll transaction will be successful and an option to track the potential payroll transaction when executed. For example, the indication may be text, an image, a video, and/or a sound effect that appears on the graphical user interface with information that the provided data values are correct and complete, and are expected to result in successful payroll transaction(s).

In some aspects, the indication is generated in response to determining that the funds will not be delayed and will meet a funding time suggested by the payment rail type. For example, if funds are to take 3-5 business days but an international issue will delay the funds to a greater time, then the indication may further include a disclaimer that delays are expected.

At 618, in response to determining that the at least one data value does not satisfy the criteria, beneficiary framework 104 generates, on a graphical user interface (e.g., user interface 106 and/or user interface 118), an indication that the potential payroll transaction will be unsuccessful. This indication is generated due to detected issues in the provided data value(s) that will cause delays or failures in transferring funds. Unlike conventional systems where the payroll transaction is initiated and then the validation is performed, via beneficiary framework 104, a user is able to determine the likelihood (e.g., probability) of success of any payroll transactions even before their execution.

In some aspects, beneficiary framework 104 may calculate a probability that payroll transaction will be successful based on an amount of rules with satisfied criteria and external factors. The former is controlled by the user's input and the latter is effected by governmental and financial institution regulations. For example, if a company goes bankrupt, an economic anomaly (e.g., recession, market crash, etc.) occur, then the probability that the payroll transaction will be successful may decrease.

In some aspects, if the probability is lower than a threshold probability due to failed criteria, then beneficiary framework 104 may enable the user to provide a corrected data value. For example, beneficiary framework 104 may generate, on the graphical user interface, at least one option to correct the at least one data value. Accordingly, beneficiary framework 104 may receive a second user input comprising at least one corrected data value to replace the at least one data value, and may validate whether the at least one corrected data value satisfies the criteria provided by the plurality of localization rules.

It should be noted that each rule may have a different weight that affects the probability. For example, a first rule involving having a correct national identification number may have twice the weight than a second rule involving the gender being provided. These weights may be entered in a function that outputs the probability.

In some aspects, beneficiary framework 104 may receive a request to track the potential payroll transaction after the potential payroll transaction is executed. Beneficiary framework 104 may thus generate, on the graphical user interface, a tracker (e.g., tracker 502) that indicates a current status of the potential payroll transaction. In some aspects, the current status is one of: generate payment transaction, lock-in rate, generate payment file, request funds, and close payments.

Figure 7:
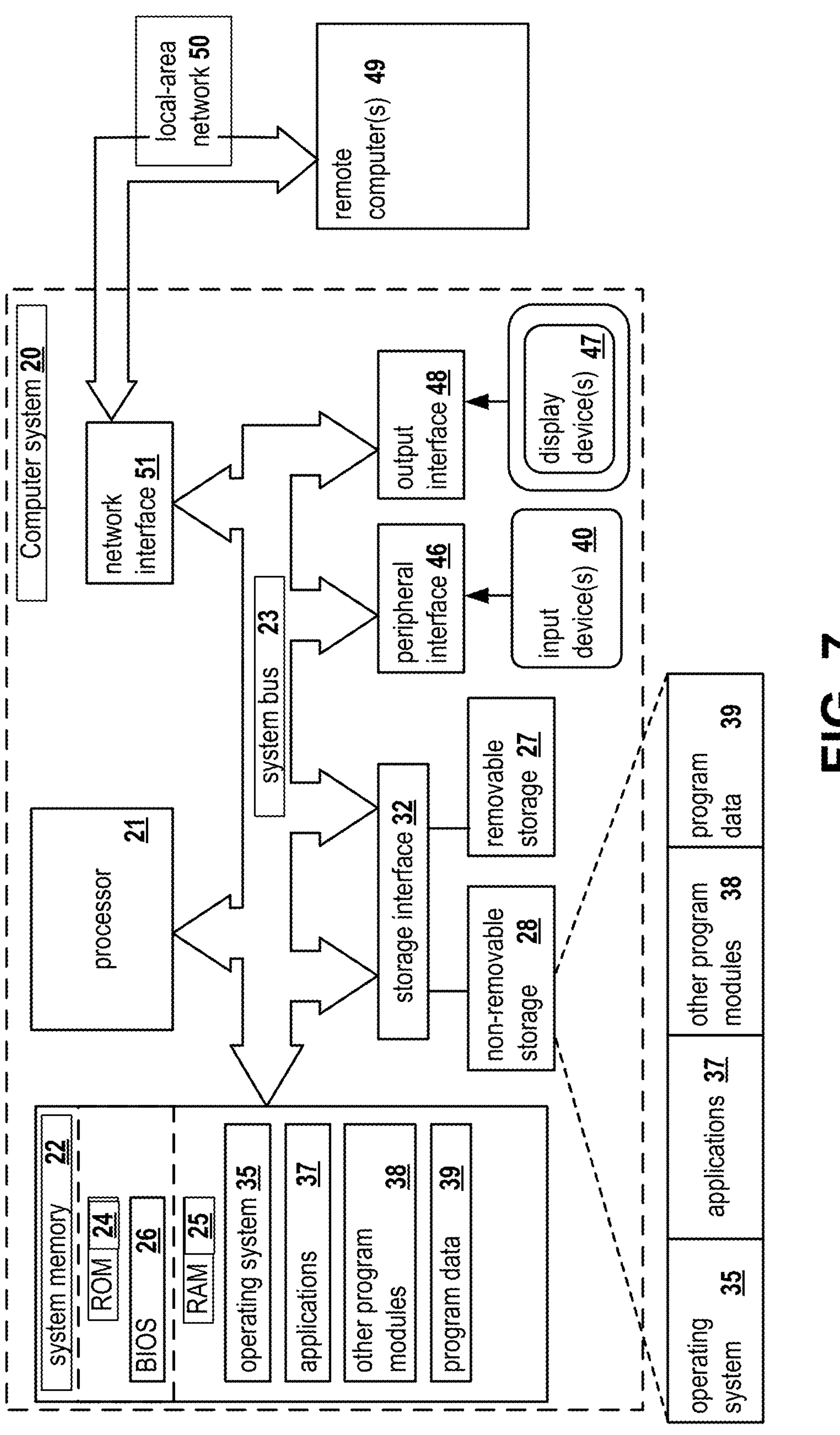
FIG. 7 presents an example of a general-purpose computer system on which aspects of the present disclosure can be implemented.

FIG. 7 presents an example of a general-purpose computer system on which aspects of the present disclosure can be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for validating payroll information using a beneficiary framework, comprising:

at least one memory; and at least one hardware processor coupled with the at least one memory and configured, individually or in combination, to:

receive a request to add, to a payment profile of a company, a beneficiary configuration comprising information about a first geographic location and a first payment rail;

generate a plurality of localization rules associated with the beneficiary configuration based on the information about the first geographic location and the first payment rail, wherein generating the plurality of localization rules comprises retrieving a specific set of data validation constraints mapped to the first payment rail, the specific set of data validation constraints including type and format of data requirements defined for the first payment rail;

receive a first user input comprising at least one data value associated with an employee of the company;

determine that the employee is associated with the beneficiary configuration;

while receiving the first user input, validate, in real-time, whether the at least one data value of the first user input satisfies criteria provided by the plurality of localization rules generated for the beneficiary configuration; and in response to determining that the at least one data value satisfies the criteria, generate, on a graphical user interface, an indication that a potential payroll transaction will be successful and initiate the potential payroll transaction by generating a payment file formatted for the first payment rail and monitoring a status of the payment file including a foreign exchange rate lock-in confirmation.

2. The system of claim 1, wherein the at least one hardware processor is configured to determine that the employee is associated with the beneficiary configuration by determining that the employee has requested payroll transactions via the first payment rail.

3. The system of claim 1, wherein the at least one hardware processor is configured to determine that the employee is associated with the beneficiary configuration by determining that the employee is a resident or works in the first geographic location.

4. The system of claim 1, wherein the at least one hardware processor is further configured to:

receive a request to track the potential payroll transaction after the potential payroll transaction is executed; and generate, on the graphical user interface, a tracker that indicates a current status of the potential payroll transaction.

5. The system of claim 4, wherein the current status is one of: generate payment transaction, lock-in rate, generate payment file, request funds, and close payments.

6. The system of claim 1, wherein information about a geographic location indicates local tax laws, local currency, and local transactional rules, and wherein information about a payment rail includes funding time, payment type, and foreign exchange rates.

7. The system of claim 1, wherein the at least one hardware processor is further configured to:

receive a second user input comprising at least one other data value associated with a different employee of the company, wherein payroll transactions of the different employee are executed using a different beneficiary configuration in the payment profile of the company; and validate the at least one other data value using a different plurality of localization rules of the different beneficiary configuration.

8. The system of claim 7, wherein the different beneficiary configuration comprises information about a second geographic location different from the first geographic location and/or a second payment rail different from the first payment rail.

9. The system of claim 7, wherein the at least one data value is a national identification number of the employee, and wherein determining that the at least one data value does not satisfy criteria of the different plurality of localization rules comprises determining that the national identification number has an invalid format, and wherein determining that the at least one other data value satisfies the criteria of the different plurality of localization rules comprises determining that the national identification number is not required to complete the payroll transactions.

10. The system of claim 1, wherein the at least one data value comprises a first data value and a second data value, wherein the at least one hardware processor is further configured to determine that the at least one data value does not satisfy the criteria in response to determining that the first data value contradicts and the second data value.

11. The system of claim 10, wherein the at least one hardware processor is further configured to generate, on the graphical user interface, at least one option to correct the at least one data value.

12. The system of claim 11, wherein the at least one hardware processor is further configured to:

receive a second user input comprising at least one corrected data value to replace the at least one data value; and validate whether the at least one corrected data value satisfies the criteria provided by the plurality of localization rules.

13. A method for validating payroll information using a beneficiary framework, comprising:

receiving a request to add, to a payment profile of a company, a beneficiary configuration comprising information about a first geographic location and a first payment rail;

generating a plurality of localization rules associated with the beneficiary configuration based on the information about the first geographic location and the first payment rail, wherein generating the plurality of localization rules comprises retrieving a specific set of data validation constraints mapped to the first payment rail, the specific set of data validation constraints including type and format of data requirements defined for the first payment rail;

receiving a first user input comprising at least one data value associated with an employee of the company;

determining that the employee is associated with the beneficiary configuration;

while receiving the first user input, validating, in real-time, whether the at least one data value of the first user input satisfies criteria provided by the plurality of localization rules generated for the beneficiary configuration; and in response to determining that the at least one data value satisfies the criteria, generating, on a graphical user interface, an indication that a potential payroll transaction will be successful and initiate the potential payroll transaction by generating a payment file formatted for the first payment rail and monitoring a status of the payment file including a foreign exchange rate lock-in confirmation.

14. The method of claim 13, wherein determining that the employee is associated with the beneficiary configuration comprises determining that the employee has requested payroll transactions via the first payment rail.

15. The method of claim 13, wherein determining that the employee is associated with the beneficiary configuration comprises determining that the employee is a resident or works in the first geographic location.

16. The method of claim 13, further comprising:

receiving a request to track the potential payroll transaction after the potential payroll transaction is executed; and generating, on the graphical user interface, a tracker that indicates a current status of the potential payroll transaction.

17. The method of claim 16, wherein the current status is one of: generate payment transaction, lock-in rate, generate payment file, request funds, and close payments.

18. The method of claim 13, wherein information about a geographic location indicates local tax laws, local currency, and local transactional rules, and wherein information about a payment rail includes funding time, payment type, and foreign exchange rates.

19. The method of claim 13, further comprising:

receiving a second user input comprising at least one other data value associated with a different employee of the company, wherein payroll transactions of the different employee are executed using a different beneficiary configuration in the payment profile of the company; and validating the at least one other data value using a different plurality of localization rules of the different beneficiary configuration.

20. A non-transitory computer readable medium storing thereon computer executable instructions for validating payroll information using a beneficiary framework, including instructions for:

receiving a request to add, to a payment profile of a company, a beneficiary configuration comprising information about a first geographic location and a first payment rail;

generating a plurality of localization rules associated with the beneficiary configuration based on the information about the first geographic location and the first payment rail, wherein generating the plurality of localization rules comprises retrieving a specific set of data validation constraints mapped to the first payment rail, the specific set of data validation constraints including type and format of data requirements defined for the first payment rail;

receiving a first user input comprising at least one data value associated with an employee of the company;

determining that the employee is associated with the beneficiary configuration;

while receiving the first user input, validating, in real-time, whether the at least one data value of the first user input satisfies criteria provided by the plurality of localization rules generated for the beneficiary configuration; and in response to determining that the at least one data value satisfies the criteria, generating, on a graphical user interface, an indication that a potential payroll transaction will be successful and initiate the potential payroll transaction by generating a payment file formatted for the first payment rail and monitoring a status of the payment file including a foreign exchange rate lock-in confirmation.

* * * * *